United States Patent
Losi

(10) Patent No.: US 9,718,310 B2
(45) Date of Patent: Aug. 1, 2017

(54) TYRE FOR VEHICLE WHEELS

(71) Applicant: PIRELLI TYRE S.P.A., Milan (IT)

(72) Inventor: Piero Losi, Milan (IT)

(73) Assignee: PIRELLI TYRE S.P.A., Milan (IT)

(*) Notice: Subject to any disclaimer, the term of this patent is extended or adjusted under 35 U.S.C. 154(b) by 193 days.

(21) Appl. No.: 14/390,621

(22) PCT Filed: Mar. 27, 2013

(86) PCT No.: PCT/IB2013/052435
§ 371 (c)(1),
(2) Date: Oct. 3, 2014

(87) PCT Pub. No.: WO2013/156881
PCT Pub. Date: Oct. 24, 2013

(65) Prior Publication Data
US 2015/0090407 A1  Apr. 2, 2015

Related U.S. Application Data

(60) Provisional application No. 61/625,908, filed on Apr. 18, 2012.

(30) Foreign Application Priority Data

Apr. 10, 2012 (IT) .................. MI2012A0573

(51) Int. Cl.
*B60C 11/00* (2006.01)
*B60C 11/01* (2006.01)
(Continued)

(52) U.S. Cl.
CPC .................. *B60C 3/06* (2013.01); *B60C 5/00* (2013.01); *B60C 11/0332* (2013.04);
(Continued)

(58) Field of Classification Search
CPC . B60C 11/00; B60C 11/0083; B60C 11/0327; B60C 3/00; B60C 3/04; B60C 3/06
See application file for complete search history.

(56) References Cited

U.S. PATENT DOCUMENTS 4,271,889 A * 6/1981 Pommier .................. B60C 3/06
                                                152/454
6,883,568 B2 * 4/2005 Muhlhoff .................. B60C 3/04
                                                152/197
(Continued)

FOREIGN PATENT DOCUMENTS

CN       1535215 A       10/2004
CN      101341034         5/2010
(Continued)

OTHER PUBLICATIONS

International Search Report from the European Patent Office for International Application No. PCT/IB2013/052435, mailing date Jul. 12, 2013.
(Continued)

*Primary Examiner* — Justin Fischer
(74) *Attorney, Agent, or Firm* — Finnegan, Henderson, Farabow, Garrett & Dunner, L.L.P.

(57) ABSTRACT

A wheel for vehicles includes: a rim and a tire mounted on the rim and inflated to an operating pressure; axial end portions of a tread band of the tire radially spaced apart the same distance from a rotation axis of the wheel and a median circumferential line of the tread band axially shifted by a predetermined distance relative to a mid-line plane of the wheel; the wheel mounted on a car with a camber angle substantially zero and with the median circumferential line shifted toward the outside of the car relative to the mid-line plane.

27 Claims, 2 Drawing Sheets

Figure 1:
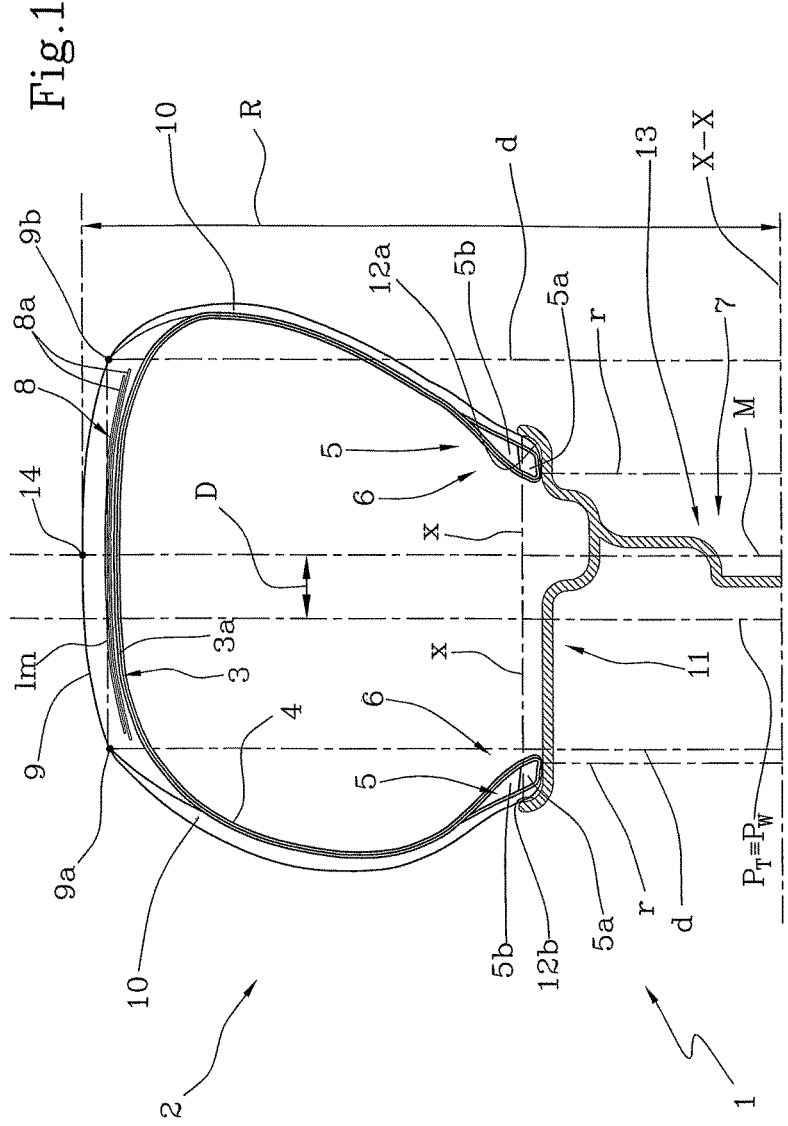

(51) Int. Cl.
- *B60C 3/00* (2006.01)
- *B60C 3/04* (2006.01)
- *B60C 3/06* (2006.01)
- *B60C 11/03* (2006.01)
- *B60C 19/00* (2006.01)
- *B60C 5/00* (2006.01)
- *B60C 25/18* (2006.01)

(52) U.S. Cl.
CPC ............ *B60C 19/001* (2013.01); *B60C 25/18* (2013.01); *B60C 2200/04* (2013.04)

(56) References Cited

U.S. PATENT DOCUMENTS

| | | |
|---|---|---|
| 2004/0226642 A1 | 11/2004 | Muhlhoff |
| 2010/0294408 A1 | 11/2010 | Bizzi et al. |

FOREIGN PATENT DOCUMENTS

| | | |
|---|---|---|
| DE | 101 13 203 | 10/2002 |
| DE | 10 2010 046 018 A1 | 3/2012 |
| EP | 0 755 808 | 1/1997 |
| EP | 2 127 913 | 12/2009 |
| EP | 2 433 818 | 3/2012 |
| JP | 2009-126424 | 6/2009 |

OTHER PUBLICATIONS

Notification of the First Office Action dated Mar. 9, 2016, from the State Intellectual Property Office of the People's Republic of China in counterpart Chinese Patent Application No. 201380024611.3.

Notification of the Second Office Action for App. No. 201380024611.3 from State Intellectual Property Office of the People's Republic of China, dated Oct. 17, 2016.

Russian Federation Office Action dated Mar. 20, 2017, for Russian counterpart Application No. 2014144266.

\* cited by examiner

TYRE FOR VEHICLE WHEELS

The present invention has as object a tyre for vehicle wheels.

Preferably, the present invention refers to road tyres of UHP (Ultra High Performance) type and to competition tyres that equip cars capable of reaching high drive performances with straight line speed even greater than 300 Km/h.

A tyre for vehicle wheels generally comprises a carcass structure associated with a belt structure. A tread band is disposed at a radially external position with respect to the belt structure. The tread is the portion of the tyre that comes into direct contact with the road surface and exchanges the forces therewith which allow driving the car along the trajectories set by the driver.

By camber angle it is intended the angle complementary to the angle formed between the rotation axis of the wheel and the axis perpendicular to the ground passing through the rotation centre of the hub. Such angle is conventionally negative if the wheel is tilted towards the car, or in other words if the lower part of the tyre that touches the ground is further away from the car than the upper tyre part.

By mid-line plane "$P_T$" of the tyre it is intended the plane orthogonal to the rotation axis of the tyre and axially equidistant from the axially external ends of the beads of the tyre.

By "beads" of the tyre it is intended the radially internal zones thereof, at which the engagement between the tyre and a respective mounting rim takes place. Each bead normally integrates an annular anchorage structure comprising at least one annular reinforcement insert, normally called bead core, bearing a filler at a radially external position. The filler, normally made of elastomer material, has a base portion joined to the bead core and tapered moving away from the rotation axis of the tyre, up to a radially external apex. In particular, each zone identified as "bead" is comprised between one of the radially internal edges of the tyre and the radially external apex of the respective filler. By mid-line plane "$P_W$" of the wheel, it is intended the plane orthogonal to the rotation axis of the wheel and axially equidistant from the axially internal ends of the two housings for the beads (rim edges) of the rim on which the tyre is mounted.

When the tyre is mounted on the rim, the two planes must coincide ($P_T = P_W$).

It is observed that by axial end portions of the tread band (which in a non-deformed tyre define two circumferences corresponding to the circumferential edges of the tread band), it is intended in this context the axial end points of the tyre that touch the road surface when the tyre in operating conditions, not collapsed (mounted on a rim and inflated to the operating pressure), and with camber angle equal to 0°, is overloaded with a load equal to about double the nominal load.

By median circumferential line of the tread band it is intended the set of points of the tread band (which in a non-deformed tyre define a circumference) equidistant from the two axial terminal ends of the tread band itself.

By medium line of the tread band it is intended the straight line that, in a radial section of the tyre, joins the two axial end portions of the tread band.

EP 0 755 808 illustrates a tyre comprising a carcass structure, which is extended around the tyre from bead to bead, two sidewalls and a tread zone. When the tyre is mounted on a rim and inflated to a predetermined pressure, the tread zone is asymmetrical and has the point of maximum diameter of the tyre shifted in the axial direction with respect to the centre line of the tyre section, towards the internal sidewall. The radial distance from the maximum diameter point of the external sidewall is greater than the radial distance from the maximum diameter point of the internal sidewall, in a manner such that the tread zone has an asymmetric profile.

JP2009126424 illustrates a tyre having a first tread provided with a low rolling strength, a second tread provided with a high "grip" and a third tread. With small camber angles, the first tread rests on the ground while the second and the third tread are separated from the road surface. With high camber angles, the second and the third tread come into contact with the road surface.

The Applicant observed that the tyres are often mounted on the cars with a camber angle for the purpose of optimizing car behaviour.

More precisely the Applicant observed that during the running of the car on a straight line, the geometry with non-zero camber angle produces, in tyres having symmetric profile, a footprint area with a non-uniform pressure distribution. For example, a negative camber angle produces, during the straight line advancement of the vehicle, a footprint area that is asymmetric relative to a plane perpendicular to the ground containing the advancement direction and passing through the rotation centre of the hub; such asymmetry shifts the application point of the resulting force, due to the contact pressures between the tyre and the road surface, towards the internal sidewall (vehicle side) of the tyre. The Applicant deems that such effect is mainly due to the fact that the medium line of the tread band is not parallel to the supporting road surface, but is instead tilted. It follows that, with every revolution of the wheel, the internal portion (vehicle side) of the footprint area is compressed and deformed to a greater extent than the external portion and this implies a non-uniform wear of the tyre in the tread (greater towards the internal portion), non-regular over time and a non-optimal behaviour, due to the inefficiency of the pressure distribution that also negatively influences the behaviour on a bend.

In such field, the Applicant set the objective to improve the performance of the tyres. In particular, the Applicant perceived the need to propose a tyre for vehicle wheels that ensures a more uniform wear of the tread during working, more regular over time, and which allows preventing the tyre performance level from dropping excessively during the useful lifetime thereof. In particular, the Applicant perceived the importance of ensuring a pressure distribution on the footprint area of the tyre that is as uniform as possible, both during running on a straight line and during travel on a bend. The Applicant finally found that by mounting a tyre with an asymmetric tread profile and with predetermined camber angle, preferably substantially zero on the car, it is possible to obtain the effect of an equivalent non-zero camber angle during the travel on a bend and the effect similar to that of a symmetric tyre with camber angle substantially equal to zero during the straight line running.

More specifically, according to a first aspect, the present invention is related to a tyre for vehicle wheels, comprising: a carcass structure having a pair of beads; a tread band disposed at a radially external position with respect to the carcass structure.

Preferably the tread band has axial end portions radially spaced apart the same distance from a rotation axis of the tyre.

Preferably a median circumferential line of the tread band is axially shifted by a predetermined distance relative to a mid-line plane of the tyre.

The Applicant observes that the claimed geometry can be found in the tyre that is not mounted on a rim.

In accordance with a second aspect, the present invention is related to a wheel for vehicles, comprising: a rim; a tyre mounted on the rim, inflated to an operating pressure and comprising: a carcass structure having a pair of beads, a tread band disposed at a radially external position with respect to the carcass structure.

Preferably axial end portions of the tread band are radially spaced apart the same distance from a rotation axis of the wheel.

Preferably a median circumferential line of the tread band is axially shifted by a predetermined distance relative to a mid-line plane of the wheel.

The Applicant observes that the geometry of the tyre is maintained when the tyre is mounted on the rim at the operating pressure. In accordance with one embodiment variant, the tyre might not have such geometry; it could assume such geometry only when it is mounted on the rim and inflated to the operating pressure.

According to a further aspect, the invention regards a method for controlling the symmetry of the footprint area of at least one same tyre running on a straight and curvilinear trajectory.

Preferably it is provided to mount said tyre on a rim, the resulting wheel being mounted on a car with a predetermined camber angle.

Preferably it is provided to inflate the tyre to an operating pressure, a median circumferential line of a tread band of the tyre being shifted towards the outside of the car by a predetermined distance relative to a mid-line plane of said wheel.

Preferably during running on a bend, the footprint area of the tread band of said tyre, when such tyre is outside the bend, takes a more symmetric configuration relative to said mid-line plane than the configuration taken during running on a straight trajectory.

The Applicant deems that the non-alignment between the median circumferential line of the tread band and the mid-line plane "$P_W$" of the wheel allows mounting the wheel on the car with a camber angle preferably substantially zero, obtaining;

on a bend, an effect equivalent to the presence of a camber angle;

on a straight trajectory, that the variation of the length of the footprint area (measured in the car advancement direction) along the axial direction (orthogonal to the car advancement direction) is more limited and the pressure distribution is more uniform relative to that of a tyre with symmetric cross section mounted with a camber angle that is optimal and non-zero in relation to that car model.

More in detail, the wheel is mounted on the car with the median circumferential line of the tread band shifted towards the outside of the vehicle and with camber angle preferably substantially zero. On a straight line or with car stationary, the footprint area is asymmetric due to the non-alignment of the median circumferential line relative to the mid-line plane "$P_W$" (or "$P_T$"), where the vertical force transmitted by the hub acts. The length of the footprint area is greater towards the internal sidewall (vehicle side) and lower towards the external sidewall but such asymmetry is still less than the asymmetry of the footprint area of a wheel with negative camber angle optimal for a tyre with symmetric cross section. Such asymmetry is lower since it lacks the contribution (in tyres with symmetric profile with negative chamger angle) given by the greater compression of the internal sidewall (vehicle side) with respect to the external sidewall due to the tilt (equal to the camber angle) of the medium line of the tread relative to the ground. On a bend, each tyre outside the bend (on which the greatest amount of centripetal force, which acts on that axis of the car, is discharged) is deformed and the footprint area takes a configuration that decreases the initial asymmetry (relative to the mid-line plane $P_W$), which is characteristic of running on a straight line with non-zero camber angle.

The Applicant finally deems that the camber angle according to the invention could in some cases be non-zero. Such application could be necessary for tyres employed on a track where, due to the geometry of the course and due to the type of vehicle employed, the camber angle could for example be −0.5° or −1°, obtaining that illustrated above for the preferred case in which said angle is substantially zero for the wheel and tyre according to the invention.

The present invention, in at least one of the aforesaid aspects, can also have one or more of the preferred characteristics which are described hereinbelow.

Preferably, the median circumferential line of the tread band is shifted towards a sidewall of the tyre that, when the tyre is installed on a vehicle, is turned towards the outside.

The sidewall which is turned towards the outside or the "external sidewall" is the sidewall that, once the tyre is installed on the vehicle, remains facing towards the outside of the vehicle itself. For the tyres with asymmetric profile such as those of the present invention, the external sidewall is unequivocally identified.

Preferably, the tread band has a symmetric profile relative to said median circumferential line.

Preferably, the tyre has a maximum radius located at the median circumferential line.

With respect to a conventional symmetrical tyre, the tread band of the tyre according to the invention is translated along the axial direction towards a sidewall of the tyre.

Preferably, each bead comprises an annular reinforcement insert and a filler fixed at a radially external position with respect to a corresponding bead core. The filler has a radially external apex, tapered moving away from the annular reinforcement insert. Each bead is extended from a radially internal edge of the tyre to a radially external apex of the filler.

In a preferred embodiment, the beads are radially spaced apart the same distance from the rotation axis of the tyre.

More preferably, the beads are symmetric relative to the mid-line plane.

Preferably, the tyre has asymmetric sidewalls relative to the mid-line plane.

In a radial section, the tyre according to the invention has a tread that is symmetric relative to its median circumferential line, and beads that are symmetric relative to the mid-line plane. Since the median circumferential line does not lie on the mid-line plane but is spaced therefrom by the predetermined distance, the sidewalls are asymmetric.

Such predetermined distance is several millimeters or several dozen millimeters.

Preferably said predetermined distance is greater than about 2 mm.

Preferably said predetermined distance is smaller than about 60 mm.

More preferably said predetermined distance is greater than about 10 mm.

More preferably said predetermined distance is smaller than about 30 mm.

Below 2 mm, the effect of said distance on the behaviour of the car is hard to recognise.

Preferably, the tyre according to the invention is a road tyre of UHP type or it is a competition tyre.

Preferably the tread band is slick.

Preferably the tread band is provided with a tread pattern.

More in detail, the present invention preferably refers to tyres with high performances which are dedicated to very powerful cars, or more generally to applications that involve high operating speeds and/or extreme driving conditions such as, for example, tyres of UHP (Ultra High Performance) type or tyres used in sports, like races on tracks (with straight line speeds even exceeding 300 Km/h). The performance of such tyres benefits from the positive effect of the tyre and the wheel according to the invention, more than other less performing tyres.

Preferably, the rim has an inwardly-facing housing for one bead and an outwardly-facing housing for the other bead when the wheel is mounted on said vehicle and the median circumferential line is shifted towards the outwardly-facing housing.

By inwardly-facing and outwardly-facing housings or "internal" and "external" housings of the rim, it is intended the housings that, once the wheel is mounted on the hub, are respectively turned towards the side of the vehicle and the side opposite thereto. The geometry of the rim, in particular with reference to the central portion adapted to receive the hub, is such to render the two housings unequivocally identifiable.

Preferably, the rim has housings for the beads that are spaced apart the same distance from the rotation axis of the wheel.

More preferably, the rim has housings for the beads that are symmetric relative to the mid-line plane.

The preferred rim is per se a conventional rim that does not require any modification to receive the tyre that gives rise to the wheel according to the invention.

Preferably, the tread band has a symmetric profile relative to the median circumferential line.

Preferably, the tyre inflated to the operating pressure has a maximum radius located at the median circumferential line.

Preferably the tyre inflated to the operating pressure has the respective beads symmetric relative to the mid-line plane.

Preferably, the tyre inflated to the operating pressure has asymmetric sidewalls relative to the mid-line plane. The preferred geometry described for the tyre is also found in the tyre mounted at the operating pressure on the rim.

Preferably, "R" being the maximum radius of the tyre inflated to the operating pressure, said predetermined distance is greater than about 0.008×R.

Preferably, "R" being the maximum radius of the tyre inflated to the operating pressure, said predetermined distance is smaller than about 0.20×R.

The predetermined distance can be expressed as equivalent to a camber angle according to the following formula.

$$D = R \times \sin(\alpha)$$

D: predetermined distance
R: maximum radius of the tyre inflated to the operating pressure
α: equivalent camber angle More preferably, "R" being the maximum radius of the tyre inflated to the operating pressure, said predetermined distance is included between about 0.030×R and about 0.090×R.

By way of example, an equivalent camber angle of 0.5° (under such value, the effect on the behaviour of the car is already hard to recognise) for a tyre with R=325 mm corresponds with a predetermined distance of 2.84 mm.

Preferably said camber angle is substantially zero.

Preferably, a medium line of the tread band of said tyre is substantially parallel to the ground at least during the running on a straight line.

Preferably, the medium line of the tread band of said tyre remains substantially parallel to the ground during running on a bend.

More preferably, during running on a bend, the footprint area of the tread band is substantially symmetric relative to the mid-line plane.

Preferably the symmetry of the footprint area during running on a straight and curvilinear trajectory is controlled, on a set of four tyres in said car.

Further characteristics and advantages will be clearer from the detailed description of a preferred but not exclusive embodiment of a tyre for vehicle wheels and a wheel for vehicles in accordance with the present invention.

Figure 2:
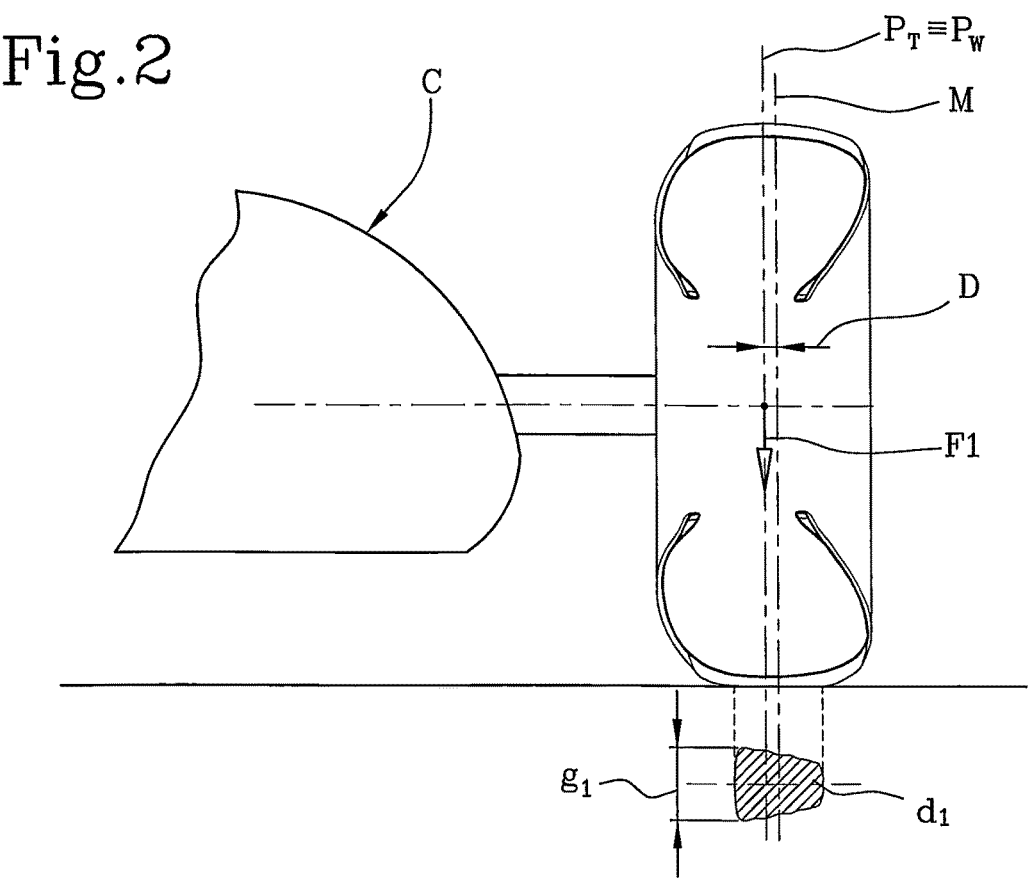
Figure 3:
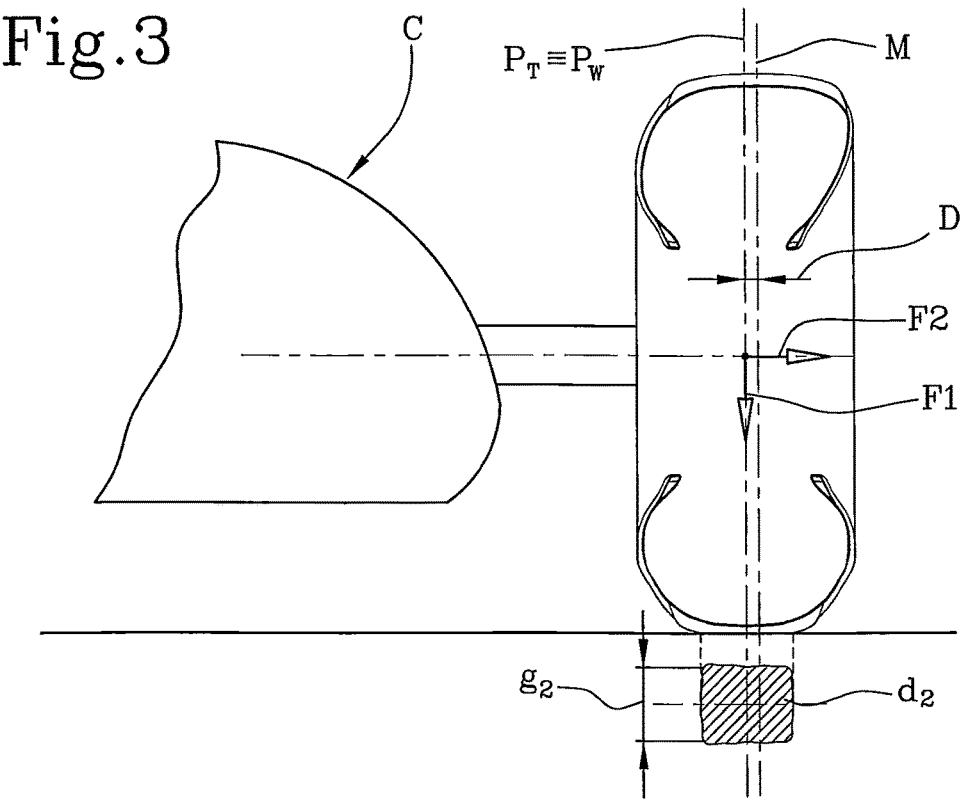

Such description will be set forth below with reference to the enclosed drawings, provided only for as an example and thus are non-limiting, in which:

FIG. 1 shows a partial radial section of a wheel for vehicles in accordance with the present invention;

FIGS. 2 and 3 schematically show a vehicle provided with the wheel of FIG. 1 in respective operative conditions and with the relative ground footprint areas.

With reference to the mentioned figures, a wheel for vehicles was indicated in its entirety with 1, such wheel comprising a tyre 2.

The tyre 2 has a carcass structure 3 that comprises at least one carcass ply 3a preferably internally covered by a layer of impermeable elastomer material or so-called liner 4. Two annular anchorage structures 5, each comprising a so-called bead core 5a preferably bearing an elastomer filler 5b at a radially external position, are engaged with respective terminal flaps of the carcass ply/plies 3a. The annular anchorage structures 5 are integrated in proximity to the zones normally identified with the name of "beads" 6, at which the engagement usually occurs between the tyre 2 and a respective mounting rim 7, in accordance with a rim diameter determined by the internal diameter size of the annular anchorage structures 5. A crown structure 8 normally comprising one or more belt layers 8a is circumferentially applied around the carcass ply/plies 3a, and a tread band 9 is circumferentially superimposed on the belt layers 8a. Two sidewalls 10, each being extended from the corresponding bead 6 at a corresponding lateral edge of the tread band 9, are applied at laterally opposite positions on the carcass ply/plies 3a.

The rim 7, per se known, has a substantially cylindrical body 11 provided with a radially external channel on which the tyre 2 is positioned. The substantially cylindrical body 11 delimits an axially external housing 12a (i.e. turned towards the outside of a vehicle when the rim is mounted on said vehicle) and an axially internal housing 12b (i.e. turned towards the vehicle side when the rim is mounted on said vehicle), one for each bead 6 of the tyre 1, defined by respective annular slots that are radially external and symmetric relative to a mid-line plane "$P_W$" orthogonal to a rotation axis "X-X" of the wheel 1 (here substantially coinciding with the rotation axis of the tyre 2 and indicated in the same mode). The rim 7 also comprises a body 13 that is radially internal, relative to the substantially cylindrical body 11, in which devices are obtained (not illustrated and defined, for example, by holes and relative bolts) for coupling the wheel 1 to the hub. In the illustrated embodiment, the radially internal body 13 is offset relative to the mid-line plane "$P_W$" and shifted towards the axially external housing 12a of the rim 7 in a manner so as to provide the necessary space inside the substantially cylindrical body 11 for placing the hub and the braking devices (e.g. brake discs and calipers).

The radial distance "r" of each of the two axially external/internal housings, respectively 12a, 12b, from the rotation axis "X-X", measured along a diameter of the rim 7, is the same. The axial distance "x", measured parallel to the rotation axis "X-X", of each of the two axially external/internal housings, respectively 12a, 12b, from the mid-line plane "$P_W$" is the same.

The two beads 6 of the tyre 1, each installed in a respective axially external/internal housing 12a, 12b, are also symmetric relative to the mid-line plane "$P_W$" (or "$P_T$"). The radial distance "r" of each of the two beads 6 from the rotation axis "X-X", measured along a diameter of the rim 7, is the same. The axial distance "x" of each of the two beads 6, measured parallel to the rotation axis "X-X", from the mid-line plane "$P_W$" (or "$P_T$") is the same.

When the tyre 2 is not mounted on the rim and when it is mounted on the rim, inflated to the operating pressure but not subjected to external stress forces, said tyre 2 has a non-symmetric geometry in a radial section (FIG. 1).

In particular—excluding the beads 6—the carcass structure 3, the belt structure 8, the tread band 9 and the sidewalls 10 of the tyre 2 are asymmetric relative to the mid-line plane "$P_W$" (or "$P_T$"). The tread band 9 is translated, relative to a conventional symmetric tyre, along an axial direction towards the axially external housing 12a of the rim 7.

In a radial section (FIG. 1), the two opposite axial ends 9a and 9b of the tread band 9 have the same radial distance "d", measured along a diameter of the wheel 1, from the rotation axis "X-X". In other words, the medium line "lm" of the tread band 9 is parallel to said rotation axis "X-X".

The tread band 9 has a median circumferential line 14 thereof (constituted by the points equidistant from the two opposite axial ends 9a and 9b) shifted by a predetermined distance "D" relative to the mid-line plane "$P_W$" (or "$P_T$"). As is visible in FIG. 1, in the illustrated embodiment, the tread band 9 is also symmetric relative to a symmetry plane "M". In other words, the median circumferential line 14 lies on the plane of symmetry "M" which is orthogonal to the rotation axis "X-X" and it is shifted by the predetermined distance "D" relative to the mid-line plane "$P_W$" (or "$P_T$").

The wheel 1 is mounted on the car "C" with a predefined camber angle "α" and the median circumferential line 14 (or plane of symmetry "M") thereof is shifted, relative to the mid-line plane "$P_W$" (or "$P_T$"), towards the outside of the car "C" itself.

Preferably said camber angle "α" is substantially zero. On a straight line path (FIG. 2), though the tyre 2 is subjected to centrifugal forces, which increase the diameter thereof, and to ground interaction forces, the tread 9 remains offset relative to the mid-line plane "$P_W$" (or "$P_T$") even at the portion directly abutted against the ground. In such operative condition, the footprint area "d1" is also offset relative to the line of intersection between the ground and the mid-line plane "$P_W$" (or "$P_T$") where the vertical force "F1" transmitted by the hub lies. Due to such asymmetry, the length "g1" of the footprint "a1" on the ground is slightly greater towards the internal sidewall (towards the car "C") of the tyre 2 than towards the external sidewall.

When a car travels a curve (FIG. 3), the force "F2" which passes from the hub to the wheel 1 tends to shift the rim 7 towards the outside while the tyre 2 portion that adheres to the ground remains adherent thereto. It follows that the tyre 2 is deformed at the portion directly abutted against the ground and at the portions in the immediate vicinity. The tread portion 9 in contact with the ground reduces or cancels its non-alignment relative to the mid-line plane "$P_W$" (or "$P_T$") (the plane of symmetry "M" and the mid-line plane "$P_W$" (or "$P_T$") approach each other possibly until they are superimposed) while the diametrically-opposed tread portion 9 maintains the abovementioned predetermined distance "D". Due to such deformation, the length "g2" of the footprint area "d2" is substantially constant along the entire axial extension of the footprint "d2" itself.

The invention claimed is:

1. A tyre for vehicle wheels, comprising:
   a carcass structure having a pair of beads; and
   a tread band disposed at a radially external position with respect to the carcass structure,
   wherein the tread band has axial end portions radially spaced apart a same distance from a rotation axis of the tyre;
   wherein a median circumferential line of the tread band is axially shifted by a predetermined distance relative to a mid-line plane of the tyre; and
   wherein each bead comprises a bead core and a filler fixed at a radially external position with respect to said bead core, wherein each bead extends from a radially internal edge of the tyre to a radially external apex of the filler, and wherein the beads are symmetric relative to the mid-line plane.

2. The tyre as claimed in claim 1, wherein the median circumferential line of the tread band is shifted toward a sidewall of the tyre that, when the tyre is installed on a vehicle, is turned toward the outside.

3. The tyre as claimed in claim 1, wherein the tread band has a symmetric profile relative to said median circumferential line.

4. The tyre as claimed in claim 1, comprising a maximum radius located at the median circumferential line.

5. The tyre as claimed in claim 1, wherein the beads are radially spaced apart a same distance from the rotation axis of the tyre.

6. The tyre as claimed in claim 1, comprising asymmetric sidewalls relative to the mid-line plane.

7. The tyre as claimed in claim 1, wherein said predetermined distance is greater than about 2 mm.

8. The tyre as claimed in claim 1, wherein said predetermined distance is smaller than about 60 mm.

9. The tyre as claimed in claim 1, wherein said tyre is of the ultra-high performance road type.

10. The tyre as claimed in claim 1, wherein the tread band is slick.

11. The tyre as claimed in claim 1, wherein the tread band is provided with a tread pattern.

12. A wheel for vehicles, comprising:
   a rim; and
   a tyre mounted on the rim, inflated to an operating pressure and comprising: a carcass structure having a pair of beads, and a tread band disposed at a radially external position with respect to the carcass structure,
   wherein axial end portions of the tread band are radially spaced apart a same distance from a rotation axis of the wheel;
   wherein a median circumferential line of the tread band is axially shifted by a predetermined distance relative to a mid-line plane of the wheel; and
   wherein each bead comprises a bead core and a filler fixed at a radially external position with respect to said bead core, wherein each bead extends from a radially internal edge of the tyre to a radially external apex of the filler, and wherein the beads are symmetric relative to the mid-line plane.

13. The wheel as claimed in claim 12, wherein the rim has an inwardly-facing housing for one bead and an outwardly-facing housing for an other bead when the wheel is mounted on said vehicle, and wherein the median circumferential line is shifted toward the outwardly-facing housing.

14. The wheel as claimed in claim 12, wherein the rim has housings for the beads that are spaced apart a same distance from the rotation axis of the wheel.

15. The wheel as claimed in claim 12, wherein the rim has housings for the beads that are symmetric relative to the mid-line plane.

16. The wheel as claimed in claim 12, wherein the tread band has a symmetric profile relative to the median circumferential line.

17. The wheel as claimed in claim 12, wherein the tyre has a maximum radius located at the median circumferential line of the tread band.

18. The wheel as claimed in claim 12, wherein the tyre has sidewalls that are asymmetric relative to the mid-line plane.

19. The wheel as claimed in claim 12, wherein, "R" being the maximum radius of the tyre, said predetermined distance is greater than about 0.008×R.

20. The wheel as claimed in claim 12, wherein, "R" being the maximum radius of the tyre, said predetermined distance is smaller than about 0.20×R.

21. The wheel as claimed in claim 12, wherein, "R" being the maximum radius of the tyre, said predetermined distance is between about 0.030×R and about 0.090×R.

22. A method for controlling symmetry of a footprint area of at least one same tyre running on a straight and curvilinear trajectory, comprising:

mounting said tyre on a rim, said tyre comprising beads, each bead comprising a bead core and a filler fixed at a radially external position with respect to said bead core, wherein each bead extends from a radially internal edge of the tyre to a radially external apex of the filler, a resulting wheel being mounted on a car with a predetermined camber angle; and inflating the tyre to an operating pressure, a median circumferential line of a tread band of the tyre being shifted toward the outside of the car by a predetermined distance relative to a mid-line plane of said wheel, wherein the beads are symmetric relative to said mid-line plane; and wherein, during running on a bend, the footprint area of the tread band of said tyre, when external to the bend, takes a more symmetric configuration relative to said mid-line plane than a configuration taken during running on a straight trajectory.

23. The method as claimed in claim 22, wherein said camber angle is substantially zero.

24. The method as claimed in claim 22, wherein a medium line of the tread band of said tyre is substantially parallel to the ground at least during running on a straight line.

25. The method as claimed in claim 24, wherein the medium line of the tread band of said tyre remains substantially parallel to the ground during running on a bend.

26. The method as claimed in claim 22, wherein, during running on a bend, the footprint area of the tread band is substantially symmetric relative to the mid-line plane.

27. The method as claimed in claim 22, wherein the symmetry of the footprint area during running on a straight and curvilinear trajectory is controlled on a set of four tyres in said car.

* * * * *